No. 836,826. PATENTED NOV. 27, 1906.
F. PETTIT.
APPARATUS FOR PURIFYING GASES.
APPLICATION FILED NOV. 17, 1904.

3 SHEETS—SHEET 1.

WITNESSES

INVENTOR
Frank Pettit

No. 836,826. PATENTED NOV. 27, 1906.
F. PETTIT.
APPARATUS FOR PURIFYING GASES.
APPLICATION FILED NOV. 17, 1904.

3 SHEETS—SHEET 2.

WITNESSES

INVENTOR
Frank Pettit

No. 836,826. PATENTED NOV. 27, 1906.
F. PETTIT.
APPARATUS FOR PURIFYING GASES.
APPLICATION FILED NOV. 17, 1904.

3 SHEETS—SHEET 3.

WITNESSES

INVENTOR
Frank Pettit

UNITED STATES PATENT OFFICE.

FRANK PETTIT, OF SHARPSVILLE, PENNSYLVANIA, ASSIGNOR OF ONE-HALF TO WALTER A. BARROWS, JR., OF SHARPSVILLE, PENNSYLVANIA.

APPARATUS FOR PURIFYING GASES.

No. 836,826.  Specification of Letters Patent.  Patented Nov. 27, 1906.

Application filed November 17, 1904. Serial No. 233,099.

*To all whom it may concern:*

Be it known that I, FRANK PETTIT, of Sharpsville, Mercer county, Pennsylvania, have invented a new and useful Apparatus for Purifying Gases, of which the following is a full, clear, and exact description, reference being had to the accompanying drawings, forming part of this specification, in which—

Figure 1:
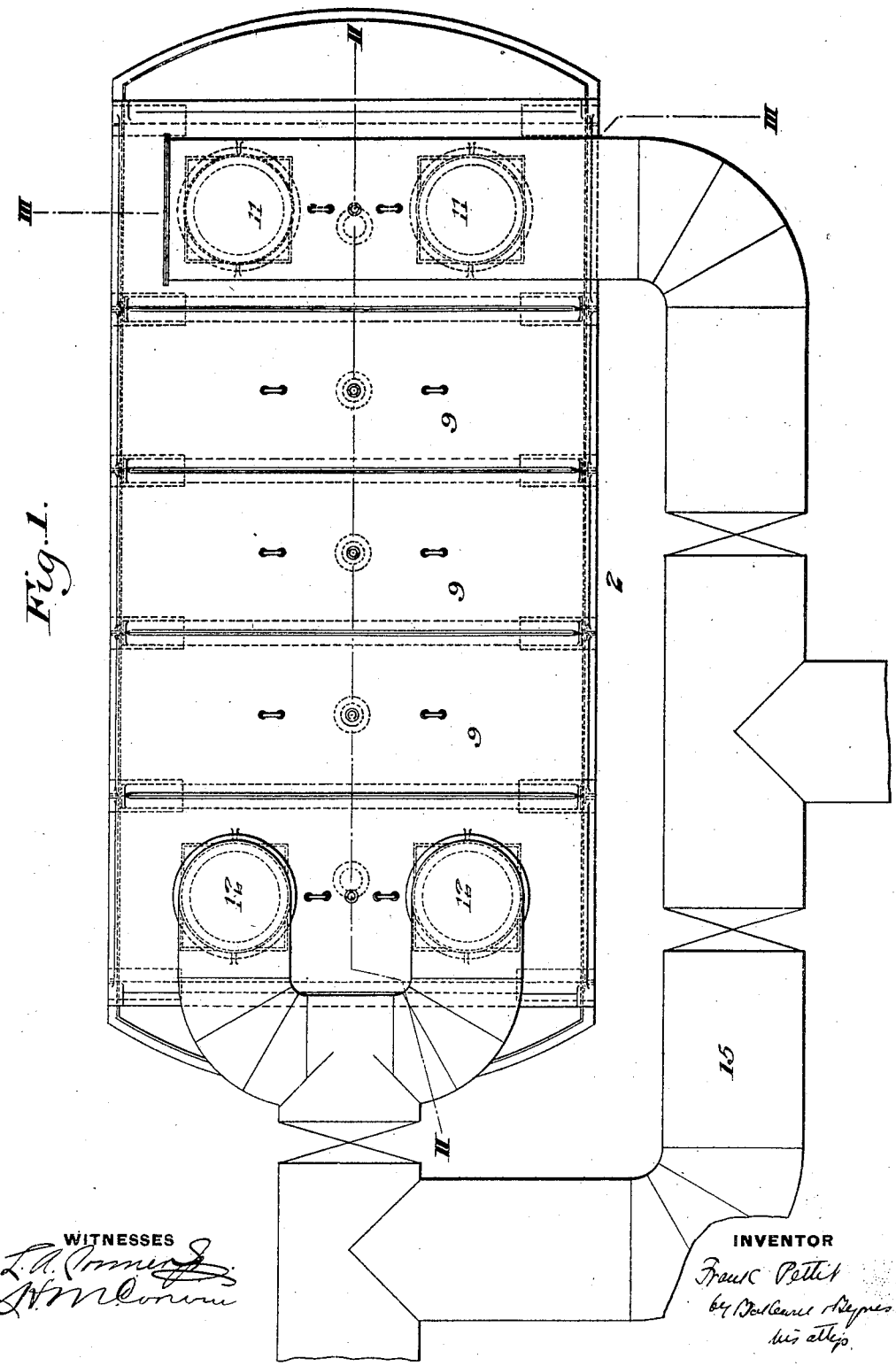
Figure 2:
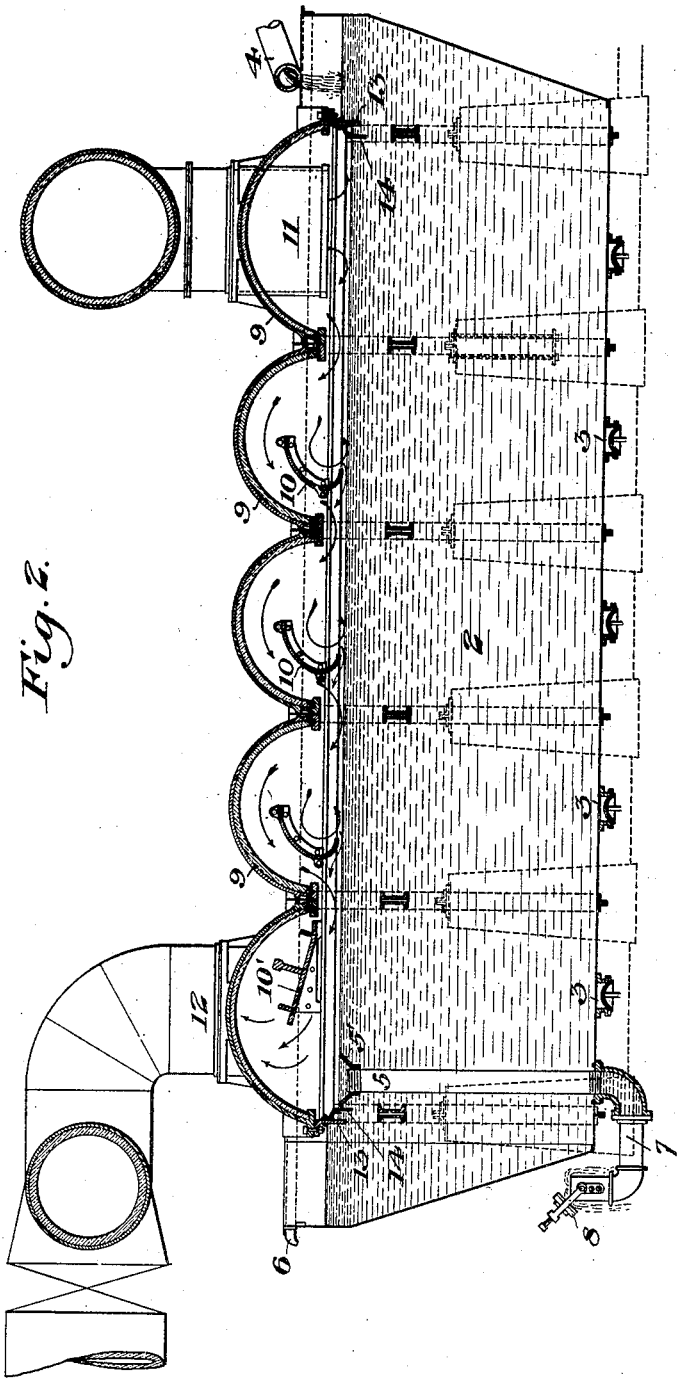
Figure 3:
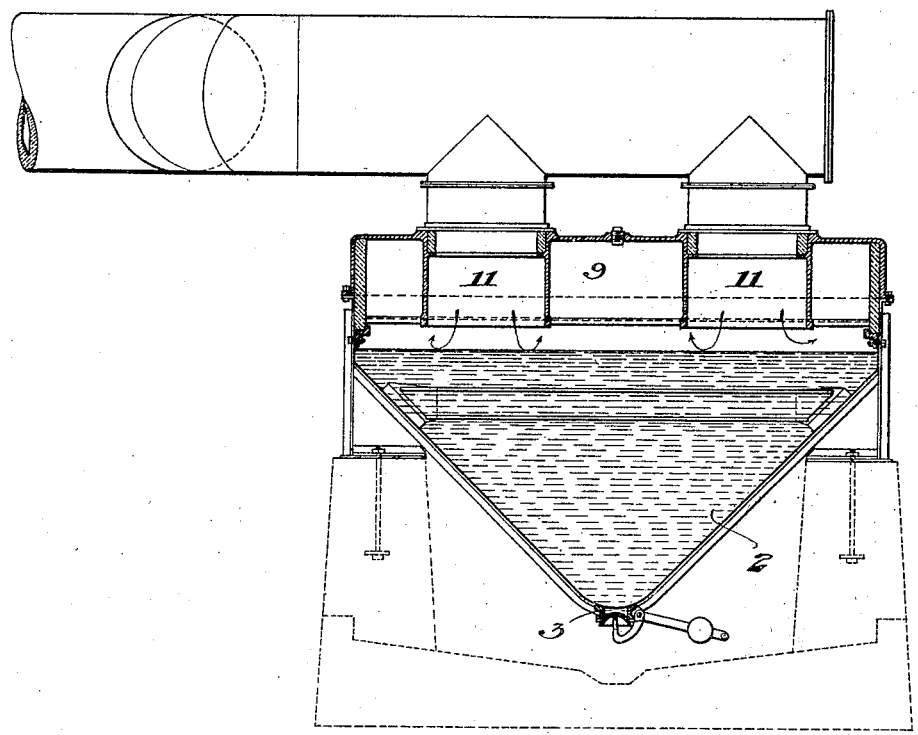

Figure 1 is a plan view of the apparatus. Fig. 2 is a longitudinal section on the line II II of Fig. 1, and Fig. 3 is a vertical cross-section on the line III III of Fig. 1.

In the utilization of gases taken from blast-furnaces and other furnaces it is important that they be freed as much as possible from the dust, of which they carry large amounts in suspension. The best means of accomplishing this is to cause the deposit of such dust upon a surface of water, which will hold it from being again taken up by the gas, and it is the purpose of my invention to provide apparatus of simpler construction and more efficient action than has been known heretofore. The object of gas-cleaners of this class is to eliminate from the gas the particles of ore, coke, &c., which are carried by the gas. These particles are usually largely of high specific gravity, but are in such an extremely finely divided stateth at they follow the gas-currents. When brought into contact with water, however, these particles readily adhere to or pass into the body of the liquid, and it is desirable to disturb or stir the gas-currents so that in the operation there shall be a maximum contact with the water. A rotary fan, driven by extraneous power, has been used for this purpose, but for treating large volumes of gas means of simpler character are extremely desirable, and it is obvious that if efficiently accomplished the utilization of the gas itself is the simplest and most desirable.

The gases coming from a blast-furnace usually have a temperature of from 400° to 600° Fahrenheit and in passing over a body of water rapidly heat its upper strata, which consequently present to the gas a surface of increasing temperature, which causes undesirable steaming of the gas. Provision must therefore be made for the rapid removal of the heated water. It is also found in practice that the fine dust, gas, &c., form upon the water a thick resisting scum, which if not removed quickly prevents contact of the gas with the water. Solidification of the dust, &c., unless rapidly removed also forms accretions upon the walls of the water-containing vessel and diminishes the effective water area. Furthermore, the gas in passing through apparatus of this character must flow through openings whose area is determined by the height of a fixed confining-wall above a water-surface, and inasmuch as the pressure of the gas varies within considerable limits it is desirable to provide means whereby the level of the water-surface within the gas-chamber does not change relatively.

The apparatus which I use and which has been designed to meet the above conditions and requirements comprises a water-tank, inclosed at the top to form a continuous gas-chamber arranged to contain one unbroken gas-body in contact with a single continuous water-surface in the sense that any floating matter thereon may traverse the surface freely to a point of exit. The gas on entering this chamber makes a direct impingement upon the water, after which in passing through the chamber it is disturbed and swirling or eddying currents are formed thereon, which cause the constant presentation to the water of new surfaces of gas. Owing to the fact that the surface of the water is continuous, being unbroken by baffles or other obstructions, the surface scum formed by the fine dust, &c., is enabled to pass freely to the discharge-outlet, and this action is facilitated by the gases. The current of gas being in the same direction as the current of water, the gas blows this scum directly toward the outlet. In this manner a fresh surface of water is constantly provided for contact with the gas. I effect this result by providing the gas-chamber with curved or irregular surfaces, which keep the gas in contact with the water, and I also employ baffle-plates, which are suspended in the current of the gases and aid in accomplishing this result. The gas escapes from the chamber through openings which are situated so as to keep the gas-current as near the surface of the water at that point as possible and afford an undisturbed exit, and thus enable the floating impurities to be skimmed from the surface of the water.

The supply of water is renewed at the end of the tank at which the gas enters and the current is in the direction of the flow of gas, so that the floating material is blown along with the gas to the overflow or skimming device, the exit of which is in the form of a water trap to prevent escape of the gas. The overflow removes scum and floating matter from the water and keeps its surface fresh and active. The overflow for the gas-chamber being within said chamber variations in the gas-pressure will change the level of the water in the tank externally of the vessel, but the level within the vessel will remain substantially constant.

In the drawings, 2 represents the water-chamber, made in the form of a tank with sides that preferably converge to the bottom and provided with valve-controlled openings 3 for the removal of sediment. Water enters the tank through a pipe 4 at one end and escapes through an overflow 5 at the other end, this overflow having, preferably, a funnel-shaped top 5', which serves as a skimmer for the removal of floating dust and other impurities. The tank has also preferably an overflow 6 at a higher level, so that by closing the overflow 5 the water being raised thereby to the level 6 will shut off the flow of gas through the apparatus. The overflow 5 is preferably formed at its lower end with a water seal or trap 7, fitted with a closing device or valve 8.

The top of the tank 2 is constituted by a roof structure, made in curved or irregular sections 9 9, preferably in the form of transverse arches of metal, the under surface and ends of which are preferably lined with bricks. This affords a continuous gas-chamber, but causes the gas in passing through the chamber from end to end to be deflected in its course and to be kept in contact with the water, the bases of the arches for this purpose being only a short distance above the surface of the water. Beneath these arches are baffle-plates 10 10, which are preferably curved, with their concavity toward the point of entrance of the gases and their lower ends somewhat above the water-level, so that the gas will be caused thereby to have a swirling motion and will be brought intimately into contact with the water. Part of the gas will pass above the baffle-plates and part below the same, as shown. The final baffle-plate 10' is preferably directed upwardly, so as to conduct the gases under it to the full length of the tank and thence to the outlet, and thus keep the gas in contact with the water as long as possible. The gas enters one end of the chamber through a pipe or pipes 11 and escapes at the other end through outlets 12.

At the ends of the tank the water is sealed by depending lips or partitions 13 and also by baffle-strips 14, which are parallel with the partitions 13, the purpose of which is to quiet the wave action of the water at the surface, which might otherwise permit the intermittent escape of the gas from the chamber.

The apparatus is provided with a by-pass pipe 15, fitted with suitable valves, so that if desired the gases may be shunted around the apparatus when it is not desired to use the same.

The advantages of the invention will be appreciated by those skilled in the art. It is useful not only for purifying the gas when it is desired to use the same for combustion, but also for recovering valuable material which has been entrained with the gas. The parts of the apparatus may be modified, since—

What I claim is—

1. A gas-cleansing apparatus having a water-chamber provided with water and gas inlets, and with water and gas outlets at a point distant from the gas-inlet, said chamber being formed to provide a continuous unobstructed water-surface between the gas-inlet and the water-outlet portions of the chamber, said chamber also having a roof portion having a series of curves arranged to deflect and keep the gas in contact with the water; substantially as described.

2. A gas-cleansing apparatus having a water-chamber provided with adjacent water and gas outlets through which chamber the gas passes in a continuous course, the chamber being arranged to provide an unbroken water-surface, said chamber having a roof or cover portion provided with a series of deflecting curves for keeping the gas in contact with such surface; substantially as described.

3. A gas-cleansing apparatus having a water-chamber having an outlet adjacent to the gas-outlet and along which the gas passes in a continuous course and formed to provide a continuous water-surface, said chamber having a series of baffles supported above the surface of the water and affording a passage for the gas above and below the same; substantially as described.

4. A gas-cleansing apparatus having a water-chamber having an outlet adjacent to the gas-outlet and along which the gas passes in a continuous course, said chamber having a roof formed with a succession of arches, and suspended baffles beneath the arches, said baffles having their lower edges above the water-surface of said chamber; substantially as described.

5. A gas-cleansing apparatus having a water-chamber having an outlet adjacent to the gas-outlet and along which the gas passes in a continuous course and providing a continuous water-surface, said chamber having a series of curved baffles supported above the surface of the water and affording a passage for the gas above and below the same said baffles having their concave faces toward the point of entrance of the gases; substantially as described.

6. A gas-cleaning apparatus, having a water-tank, said tank having a gas-inlet and water-inlet at one end, and a water-inlet and water-outlet at the opposite end, and a roof structure for said tank, having a series of transverse arches, with curved baffles suspended therein entirely above the water-level and forming passages for gas both above and below the baffles, said baffles having their curved faces toward the point of entrance of the gases; substantially as described.

7. A gas-cleansing apparatus having a water-chamber provided with a gas-inlet and a water-inlet at one end, a gas-outlet and water-outlet at the opposite end, and an unobstructed water-surface between the water-inlet and the water-outlet, said chamber having above the surface of the water a series of baffles forming a gas-passage both above and below themselves; substantially as described.

8. A gas-cleansing apparatus having a water-chamber formed to provide a continuous water-surface, an inlet for the gas arranged to cause the gas upon entering to impinge upon the water in said chamber, said chamber having a roof formed of a succession of arches to keep the gas in contact with the water in said chamber and flowing in a continuous course therethrough said chamber having an unobstructed water-surface therein and a water-outlet adjacent to the gas-outlet; substantially as described.

9. A gas-cleansing apparatus, comprising a water-tank, a roof structure inclosing a portion of said tank and having a series of arches, said roof structure having a gas-inlet at one end portion and a gas-outlet at the opposite end portion, and the water-tank having a water-inlet at one end portion and a water-outlet at the opposite end portion, said outlet being within the inclosed portion of the tank, and the tank having an unbroken water-surface between the inlet and the outlet; substantially as described.

In testimony whereof I have hereunto set my hand.

FRANK PETTIT.

Witnesses:
MYRON E. CROWLEY,
J. L. MCGOWAN.